W & T. Schnebly.
Harvester Droppers.
N° 9038. Patented Jun. 15, 1852.
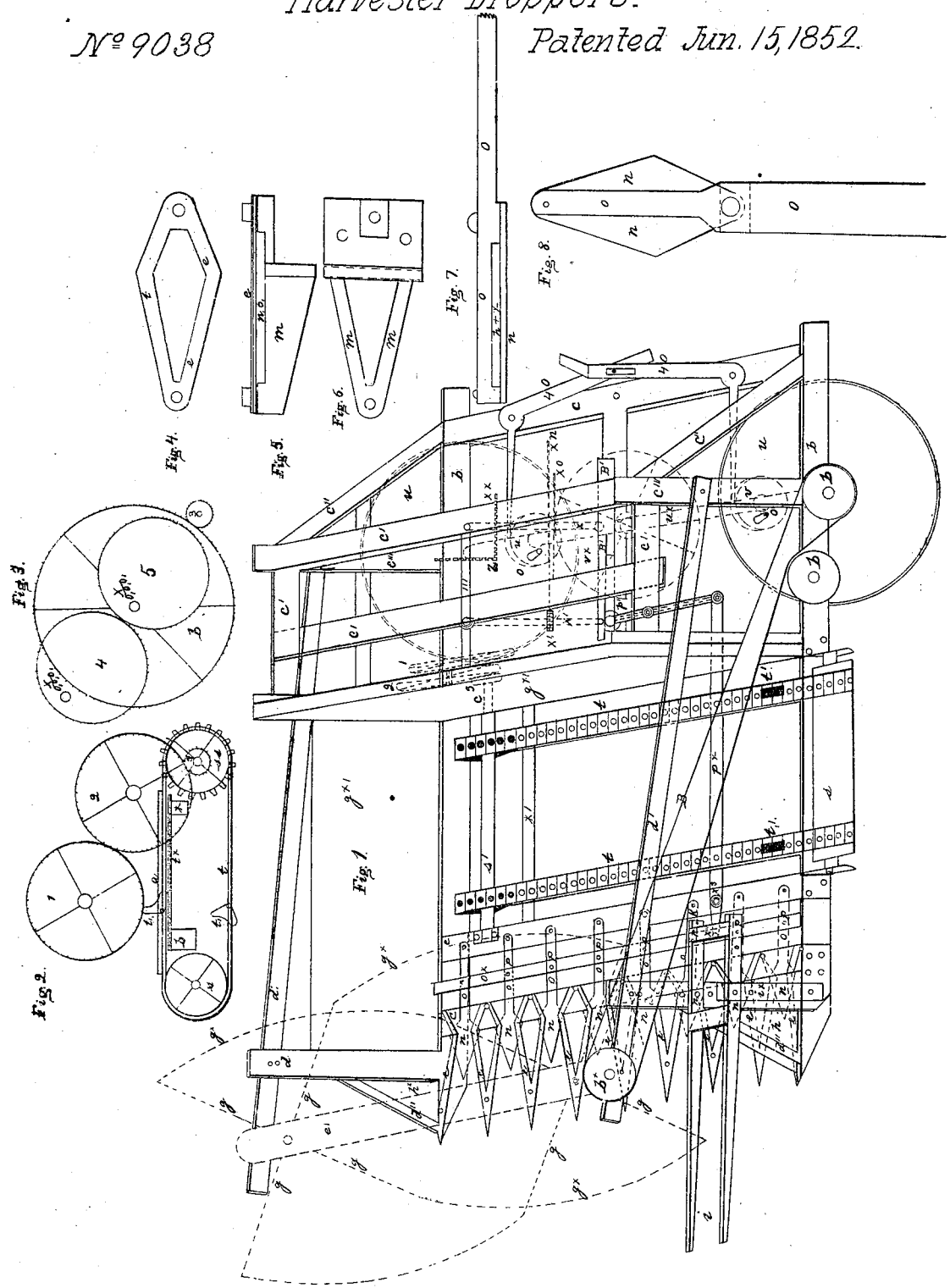

UNITED STATES PATENT OFFICE.

WILLIAM SCHNEBLY AND THOS. SCHNEBLY, OF NEW YORK, N. Y.

IMPROVEMENT IN HARVESTERS.

Specification forming part of Letters Patent No. 9,038, dated June 15, 1852.

*To all whom it may concern:*

Be it known that we, WILLIAM SCHNEBLY and THOMAS SCHNEBLY, of the city of New York, State of New York, have invented new Improvements on our original patent, dated August 22, 1833, for Cutting Grain, Grass, &c., by Horse-Power; and we do hereby declare that the following is a full, clear, and exact description thereof, reference being had to the accompanying drawings, making part of this specification, in which—

Figure 1 represents a perspective view; Fig. 2, an end elevation of the receiving board or platform and the apparatus for discharging or raking the grain therefrom; Fig. 3, an end elevation or back view of gear, intended also for discharging the grain from the platform; Fig. 4, a top view of a steel plate or stationary cutter; Fig. 5, side elevation of the guard-piece or projector with the stationary cutter screwed fast to it; Fig. 6, top view of the guard-piece or projector; Fig. 7, side view of the movable cutter; Fig. 8, top view of the movable cutter.

The same letters indicate like parts in all the figures.

In our improved harvester we make the frame-work of suitable material and proportions, similar to the original, but varying in the following points: first, in the manner of constructing the guards or projectors; second, in the method of constructing and arranging the movable cutters; third, in the method of mounting the reel; fourth, in the method of constructing the raking-fingers upon the chain-bands and the arrangement of the same in combination with the bridges under the platform; fifth, in the method of constructing the cog-gearing and arrangement of the same in combination with the knee-formed fingers on the chain-bands and the bridges.

Our improvement therefore consists, in the first place, in constructing the cutters, guard-pieces, or projectors of a minimum size, making the stationary cutters of one piece each, by which method we reduce the duty which each has to perform, as the width of the swath or cut is now occupied by a greater multiplicity of cutters than in the old original machine, diminishing greatly and necessarily the power required to operate them.

Our improvement consists, also, in the change made in the process of cutting. We now use levers on which the steel cutters are fastened—that is, the movable cutters—and, instead of cutting as a common pair of shears or scissors, we now make the cut on the radius principle, similar to that of a semicircular or elliptical motion, as the cutters are fastened on the end of each radius, and not like the original plan, which had merely a closing motion from heel to point, as the whole of the distance from the fulcrum to the end of the shear was then used as cutting-surface. In our present plan the cut is made with more force and effect in proportion to the length of the radius, or the distance from the axis to the cutters, the duty being performed at a distance from the center of action, and not commencing at the center of action, as in the old plan. This mode of arrangement likewise facilitates the manufacturing of the machine, reduces the expense and weight of the machine, and enables the farmer to handle it with more convenience, and to repair or replace the cutters, &c., in case of accidents or breakage.

Our improvement consists, also, in constructing the reel of separate arms, with bowed or elliptical cross-bars made of wire or suitable material, which enables us to take up the lodged grain or take in the standing grain to a much better advantage; and another important feature is the power to increase the diameter of the reel at pleasure by having the arms disconnected and made long enough for that purpose and confined in the flange or shaft by set-screws. This duty of increasing the diameter of the reel often becomes necessary in short grain or grass, which we can accomplish by this method without the necessity of lowering the axis of the same; but even in this feature we have now the power to do it also, as we support the reel on braces, which, being attached to the uprights in front and the frame behind, may be set lower or higher at pleasure. We refer to the description of the original patent for the precise method of constructing the reel, &c. In our present plan we are enabled to throw the reel (by the use of the braces attached to the frame behind and the uprights in front) as far in advance of the uprights as may be deemed suitable, or lower it, to pick up or prepare the worst lodged grain for a free passage of the machine into it.

Our improvement consists, also, in having but one shaft for the ground-wheel to support the frame, both wheels now being made to run loose, or to be coupled at pleasure, to give motion or not to the machinery. In this plan we bring both wheels into requisition, which is greatly superior, rendering the motion of the machinery more certain, as one wheel is likely to bounce or slip on rough and uneven ground when the machine is moving.

Lastly, our improvement consists, also, in the method of discharging or raking the grain from the receiving board or platform. In our present plan we use or employ chain-bands running over cog-pulleys with a continuous motion, having knee-formed teeth or fingers protruding upward through the platform in openings or crevices made for them, these teeth or fingers being attached to the chain-bands by a suitable fixture and bridges, on which they travel, to permit them to stand in a perpendicular manner in raking off the grain, or to fall back toward a horizontal position when not thus employed in their passage around the pulleys and when passing under the platform, which can be made to pass on regularly by common gearing, or by an increased motion when passing through the platform in the act of discharging the grain, and by a diminished motion when they are passing under the platform, by the use or employment of semicircular elliptical and eccentric gearing, differing from the other kind which will produce such a result, which to the best of our knowledge has never been done before.

Figure 1 represents the machine in perspective view with the receiver or platform $a$ removed. (Seen in Fig. 2.) $b\,b$ represent the frame; $c\,c\,c$, cross or connecting pieces; $d\,d_*$ parallel uprights, with parallel braces $d''\,d''$, on which the parallel supports $d^r\,d'$ are resting, forming the bearings for the reel-shaft $e'$, on which it revolves; $f^\times$, reel-pulley; $f\,f$, driving and friction pulleys; $g\,g\,g\,g$, detached arms of the reel; $g^\times\,g^\times\,g^\times\,g^\times$, bowed or elliptical cross-bars. $h^\times\,h$ represent metal or other plates. $h^\times$, on the right, is somewhat in the shape a colter and mold-board, to separate the standing or lodged grain from that which is cut, being attached to the brace $d''$ and upright $d$. $h$, on the left side, flares outward toward the shafts $i$, being a kind of mold-board, to throw the grain which is not cut into the influence of the reel on the side next to the shafts. It is also fastened to the upright $d$ and brace $d''$. $i$ represents the shafts for the horses, which are bolted to the upright $d$ and an iron support, $i^\times$, which is connected with the frame below. The hinder part of the shafts are confined to an iron brace at $k$, said brace being attached to the upright $d$. (Not seen in the drawings.) $l\,l\,l\,l\,l\,l$ represent the stationary steel plates, (seen also in Fig. 4,) forming cutters, which are screwed fast to the hollow guard-pieces or projectors, supposed to be underneath, as seen in Figs. 5 and 6 at $m\,m$. $n\,n\,n\,n\,n\,n$ represent a series of double-edged steel plates, forming the movable cutters, (also seen in Figs. 7 and 8,) which are attached to their levers $o\,o\,o\,o\,o\,o$, (also seen in Figs. 7 and 8,) said levers being bolted to the cross-piece $c$ in the rear as a center of motion. $o^\times$ is a lateral bar, with pins $p\,p\,p\,p\,p$, which fall into the holes of the levers $o\,o\,o\,o$, &c., and connect them together. $p^\times$ is a lever running back under the platform to connect with the crank $p''$, the fulcrum of the lever $p^\times$ being in the cross-piece $c$ in the rear of the cutters at $x^3$, which connects with the lateral bar $o^\times$ with pins at $x''$; $g^{\times\prime}\,g^{\times\prime}$, guard-boards to keep the cut grain from slipping from the platform. $s'$ is a shaft, with two or more cog-pulleys on it, resting on the cross-pieces $c\,c$, inside of the frame, below the receiver or platform. $s$ is also a similar arrangement on the outside of the frame, which contains two or more chain belts, $t\,t$, with knee-formed fingers or rakers $t'\,t'$ on them, which are also seen in Fig. 2. $u\,u$ are two ground-wheels, which support the machine, placed inside of the frame $b\,b$. $u^\times$ is one main shaft, lying horizontally, on which the wheels $u\,u$, the couplings $v\,v$, and spur or bevel cog-wheel $v^\times$ are placed. $x$ and $x'$ are two perpendicular shafts, standing on a raised block, $B'\,B'$, on which the gearing $x^o$, $x^n$, and $x^L$ are placed to give suitable motion to the cutters, having the crank $p''$ on the bottom of the shaft $x'$. On the shaft $x$ we have a wheel, $x\,x$, gearing into a wheel, $z$, giving motion to shaft $1\,1\,1$, lying horizontally, which gives motion to the discharging apparatus, the wheels $1\,2$ and pinion $3$ being of the regular shape, which is seen also in Fig. 2. $c'\,c'$ are caps or upper cross-pieces, which support the perpendicular shafts $x$ and $x'$. $c''\,c''$ are braces; $c'''\,c'''$, uprights to support the cap $c'$; $L\,o\,L\,o$, levers to command the couplings or clutches $v\,v$, which put the machine in operation or checks it. $B$ is a belt to give motion to the reel.

Fig. 2 represents an end elevation of the gearing 1, 2, and 3, to propel the discharging apparatus, and also an end or edge view of the receiver or platform $a$, with the chain bands $t\,t$, the knee-formed fingers or teeth $t'\,t'$, the cog-pulleys $s'\,s$, and the bridges $t\,x$. Fig. 3 represents an end elevation of the gearing, (better represented in the detached drawing,) which may be used, instead of that described in Fig. 2, to produce an increased and a diminished motion alternately on the discharging apparatus. 4 and 5 are each a wheel of proper size, with one half of the circumference of each formed in a regular circle and the other half of the circumference of each formed of an irregular or elliptical shape to the regular half, and when placed each on an eccentric-axis, as at $o\,o^\times\,o$, with the regular part of the circle or cogs of the one put in gear with the irregular or elliptical portion or cogs of the other, the wheel 6, being a regular wheel and on the same axis with 5 at $o\,o^\times\,o$, and being propelled by the shaft $1\,1\,1$, in Fig. 1, on which the wheel 4 is fastened, and also being in gear with the pinion 3 on the pulley-shaft $s'$, as in Figs. 1 and 2, the result will be that the fingers or teeth $t'\,t'$ or discharging apparatus will have an increased motion as they pass over the bridges *t x* through the crevices of the platform *a* above, and a diminished motion when they pass under the platform *a* toward the cog-pulleys and shaft *s'*, for the reason that when the radius of the wheel 4 is being increased or lengthened in its revolution the radius of the wheel 5 is shortened in its revolution, and vice versa, and consequently a change of motion is produced alternately, which prevents the grain which is being discharged from being intercepted by the grain being cut, as it gives a quick discharge of the grain from the platform *a*, which is a very important improvement.

Fig. 3 detached represents a better view of the regular and irregular gearing for propelling the discharging apparatus; Fig. 4, top view of steel-cutter *e*, being hollow; Fig. 5, side view of the hollow guard-pieces or projectors *m m m*, with the cutters *e* screwed fast to them; Fig. 6, top view of hollow guard-pieces or projectors *m*. When in the condition of Fig. 5 it is ready for use. Fig. 7 represents a side view of the steel-cutter *n*, attached to the lever *o o*. Fig. 8 is a top view of the movable cutter *n* and levers *o o*.

The different parts being referred to, we will now point out more particularly their relation and connection and the manner of construction.

In constructing a machine of the above improvements the parts should be made so as to combine strength and lightness. The frame *b b* should be reduced from its greatest thickness in front of the ground-wheels *a a* to about one and a quarter (more or less) inches at the front cross-pieces, *c c*, and to be of suitable width. The guard pieces or projectors *m m m* (supposed to be under the stationary cutters *e e e*, and not seen in Fig. 1, but in Figs. 5 and 6) should be made of malleable cast-iron, or, if preferred, of boiler-iron, and firmly screwed fast to the front cross-pieces, *c*. Said guard-pieces or projectors should be made of triangular shape and hollow, so as to permit any clogging particles to fall through to the ground, and thus effectually prevent the choking of the cutters. The stationary cutters *e e e* are made of proper material, of similar shape and size to the hollow triangular guards *m m m*, but somewhat wider, to allow of being ground when necessary without destroying their utility. The stationary cutters *e e e* are to be raised up high enough on prepared seats on the front and rear ends of the hollow guards or projectors *m m m*, and riveted fast to form the spaces for the movable cutters *n n n* to play into freely. The edges of the stationary cutters *e e e* are beveled in such a manner as to make their lower edges sharp. It follows from this arrangement of the cutters and guards or projectors that the lower edges of the stationary cutters must be sharp, and that the upper edge of the movable cutters must be sharp as a matter of necessity, as we design not to cut against the edge of the guard or projection below, but against the edge of the stationary cutter above, while the movable cutters *n n n* play into the spaces created between them, which is different from our original plan of August 22, 1833. Then we cut against the upper edges of the stationary blades, which laid flat on the solid projectors, with parallel edges, and beneath the movable cutters, which had their bottom or lower edges sharpened. In our first experiments, long before the patent was issued, we tried extra plates above the stationary cutters, forming a groove for the movable cutters to play in, (but which we soon abandoned,) which greatly assisted in making a clean cut so long as the groove kept free from deposits, which followed as a matter of course, as no provision had been made to prevent the difficulty, as the projectors were then solid, with plates or blades of parallel edges, in combination with the movable shears or cutters working on the top.

In our improved plan we have the hollow triangular guards or projectors, with their stationary cutters attached, creating a space for the movable cutters to play into freely, at the same time bringing the sharpened edges of the stationary cutters into requisition in the duty of cutting. By this arrangement we prevent most effectually the liability even of clogging, as no deposit can remain beneath the cutters or in the spaces between, for the reason that the movable blades or cutters will always force such obstructions into the hollow of the guards or projectors, when they will consequently fall through to the ground. Another reason is, that the sides of the guards or projectors are too thin to retain any deposit, even should the movable cutters not pass all the way through into the hollow of the same, which we deem a very important improvement over all other kinds of projectors not having these points.

We also form the movable cutters *n n n* of steel plates of similar size and shape to the front portion of the guards and stationary blades, which are also screwed or riveted to levers *o o o o*, being of the third order of levers, and from six to twelve inches long, (more or less,) which act as radiuses, having their center of motion or axis in the second cross-piece *c*, or, if preferred, in the first cross-piece *c*, provided it be made wide enough for that purpose. The movable cutters *n n n* are located between the guards or projectors *m m*, with a small portion of their edges projecting over the stationary cutters, when closed on either side, to prevent the straw from passing out of the angle in the progress of the machine, and thus, with the sharp upper edges of the movable cutters playing below and with the aid of the sharp under edges of the stationary cutters above, the duty is performed effectually.

The spaces *h x x* between the cutters (seen in Fig. 7) permit the edges of the stationary cutters *e e e e* to pass through without any interference, though this is not to be generally followed as a rule, as the levers or radiuses *o o* may terminate at the point in Fig. 8. In this case it will be necessary to continue the steel plate farther back to receive a sufficient quantity of rivets to secure it. The lateral bar or connecting-rod $o\,x$ is made sufficiently strong and light, with pins $p\,p\,p\,p$ riveted to it, of proper diameter to fill the holes snugly in the radiuses or levers $o\,o\,o\,o$. This bar $o\,x$ is located between the cross-pieces $c\,c$, and in front of the fulcrum or centers of action of the radiuses or levers $o\,o\,o\,o$, which are in the second cross-piece $c$, and in the center of the distance of the space between the guard-pieces $m\,m\,m\,m$, &c., so that the motion of the movable cutters will be equally divided on either side, which is communicated to them by a connection with the lever $p\,x$ of the first order of levers, lying at right angles to the lateral connecting-bar $o\,x$ and stretching back to the rear of the platform on a line with the crank $p''$, the fulcrum $x^3$ of this lever being in the second cross-piece $c$, which gives great power and force and a peculiar motion to the movable cutters $n\,n\,n$, differing entirely from our original plan, and, we believe, from all the subsequent devices which have been employed.

The reel should be constructed of wire or otherwise with separate arms, as seen in Fig. 1, the arms $g\,g\,g\,g\,g$ to be confined in suitable flanges or boxes on the shaft $e$, which may be made of iron and light withal. The most simple contrivance may be used to produce the effect of elongating the arms or increasing the diameter of the reel. The cross-bars $g^x\,g^x\,g^x\,g^x$ are to be lowered or formed into an elliptical shape, and thrown out toward the uprights $d\,d$ as far as possible, to embrace the grain more readily and collect it more into a body before being cut, and to facilitate the discharge of the same from the platform $a$ after it is cut, which covers the space above the chain-bands $t\,t$ and between the guard-boards $g'^x\,g'^x$. Beside being able to increase the diameter of the reel, we have the power also of lowering it by means of the parallel braces $d'\,d'$, which sustain the reel. This can be effected by lowering the ends of braces at $d\,d$, parallel uprights with additional bolt-holes, &c., to suit the convenience of the operator.

To give a more particular description of the discharging apparatus, we refer to Fig. 2. The receiving board or platform $a$ rests on the frame $b\,b$ on either side. (Not shown.) It is made with open spaces, to permit the knee-formed fingers or teeth $t'\,t'$ to pass through them. They are fastened on the chain bands $t\,t$ by a suitable fixture to permit them to perform their office and project through the platform $a$ sufficiently high to scrape off the grain in their passage. As the fingers or teeth $t'\,t'$ pass through the crevices of the platform $a$, they maintain a perpendicular position by resting on the bridges $t^x$ beneath the chain bands $t\,t$. The bridges have their support on the frame $b$ and cross-piece $x'$. When the knee-formed fingers or rakers $t'\,t'$ pass from the bridges and around the pulleys $s$ their perpendicular position is no longer maintained, and they are then permitted to play more horizontally on the chain bands, to prevent any contact with obstacles below as they pass onward to mount the pulleys $s'$. These fingers are formed of metal in the shape of a knee, and made thin in that portion above the chain bands which protrudes through the platform, so as not to require much opening through the platform $a$, but to be wider in that portion which is below the chain bands, to prevent rapid wear in passing over the bridges $t^x\,t^x$. These knee-formed fingers or rakers $t'\,t'$ are so attached to the chain bands by a pivot or joint-pin to allow them to change their position when passing under the platform, to obviate a difficulty experienced in our original plan, of passing the raker or scraper over the top surface of the platform, when attached to belts in a fixed or unchangeable position, as it would often tangle the grain and clog the operation by getting the grain under the belts, and often gather loose grain from the stubbles below and carry it up on the platform again.

The most successful mode in our early experiments was the revolving cloth surrounding two parallel rollers occupying the space of the platform, which was made to revolve at intervals. Our present method is designed to remove all these difficulties attendant upon such devices as our original plans, and as we now have the important features of the accommodating knee-formed fingers or rakers with the certainty of their movement on the chain-bands and cog-pulleys, we can accomplish our object most successfully. The pulleys 1 2 and pinion 3, as also seen in Fig. 1, propelled by the same shaft 1 1 1 give a regular continuous motion to the discharging apparatus. The plan in Fig. 3 detached will send the grain from the platform with accelerated force, and in less time than the plan of Fig. 2. The wheels 1 and 2 in Figs. 1 and 2 must give place to wheels 4 and 5 in Fig. 3 detached when they are to be used instead of wheels 1 and 2.

Thus, then, we have fully described the parts of our machine, and by putting the coupling in gear $v\,v$ with the wheels $u\,u$, by means of a pin and hole, the shaft $a^x$ gives motion to the wheel $v^x$, to the shaft $x$, wheels $x\,o$, $x\,n$, $x\,x$, $z$, the shaft 1 1 1, spur-wheels 1 2, and pinion 3 or 3 4 6, and pinion 3 detached, which moves the discharging apparatus, moving also the pinion $x\,L$, and shaft $x'$, and crank $p''$, giving motion to the lever $p\,x$, whose fulcrum $x^3$ is in the second cross-piece $c$, the other end of which connects with the bar $o\,x$ at $x''$, giving motion to the double-edged cutters or shears $n\,n\,n\,n$, &c., which must be made sufficiently rapid by the proportion of the wheels to execute or perform the required duty of cutting off the grain as the machine progresses.

The motion to the reel may be produced by a band, B, from pulley $f$, or by cog-gearing, or otherwise, which the taste of farmers may prefer.

From this description it will be seen that our present improvements differ from the original invention of the 22d August, 1833.

We claim as our invention—

1. The arrangement of the bridges beneath the platform, in combination with chain-bands having accommodating knee-formed fingers or rakers working on pivots and attached thereto, substantially as described.

2. Working the vibrating cutter between an under and an upper open guard or finger, as described and represented.

W. SCHNEBLY.
THOS. SCHNEBLY.

Witnesses:
EDMUND M. EVANS,
EDWARD STEPHENS.